(12) United States Patent  (10) Patent No.: US 8,322,209 B2
Boström  (45) Date of Patent: Dec. 4, 2012

(54) LIQUID LEVEL MEASUREMENT DEVICE AND METHOD

(75) Inventor: Jan Boström, Göteborg (SE)

(73) Assignee: Axsensor AB, Gothenburg (SE)

( * ) Notice: Subject to any disclaimer, the term of this patent is extended or adjusted under 35 U.S.C. 154(b) by 207 days.

(21) Appl. No.: 12/733,066

(22) PCT Filed: Jul. 25, 2008

(86) PCT No.: PCT/SE2008/050892
§ 371 (c)(1), (2), (4) Date: Apr. 21, 2010

(87) PCT Pub. No.: WO2009/020424
PCT Pub. Date: Feb. 12, 2009

(65) Prior Publication Data
US 2010/0212418 A1    Aug. 26, 2010

(30) Foreign Application Priority Data
Aug. 7, 2007 (SE) .................... 0701832-8

(51) Int. Cl.
*G01F 23/00* (2006.01)

(52) U.S. Cl. .................... 73/290 V

(58) Field of Classification Search .............. 73/290 V
See application file for complete search history.

(56) References Cited

U.S. PATENT DOCUMENTS

| 4,909,080 | A | 3/1990 | Kikuta et al. | |
| 5,471,872 | A | 12/1995 | Cummings | |
| 6,983,654 | B2 * | 1/2006 | Balin et al. | 73/290 V |
| 7,571,645 | B2 * | 8/2009 | Bostrom | 73/290 V |
| 2007/0204689 | A1 | 9/2007 | Boström | |

FOREIGN PATENT DOCUMENTS

| DE | 44 19 462 | 12/1995 |
| WO | WO 2005/038415 | 4/2005 |

OTHER PUBLICATIONS

Intnernational Search Report

* cited by examiner

*Primary Examiner* — Peter Macchiarolo
*Assistant Examiner* — Jamar Ray
(74) *Attorney, Agent, or Firm* — Harness, Dickey & Pierce, P.L.C.

(57) ABSTRACT

At least one embodiment of the present invention relates to a device for providing a compensated measurement of the level of a liquid in a tank. In at least one embodiment, the device includes a transducer adapted to transmit and receive acoustic signals; a waveguide connected to the transducer and adapted to extend into the liquid; at least one collecting device for collecting free-moving portions of said liquid; and at least one directing device for directing fluid originating from liquid collected by the collecting device into or along a portion of the waveguide which during operation is located above the liquid level. At least one embodiment of the present invention also relates to a corresponding method.

15 Claims, 6 Drawing Sheets

LIQUID LEVEL MEASUREMENT DEVICE AND METHOD

FIELD OF THE INVENTION

The present invention relates to a device and method for providing a compensated measurement of the level of a liquid in a tank.

BACKGROUND OF THE INVENTION

An example of a device for providing a compensated measurement of the level of a liquid in a tank is disclosed in the international patent application publication no. WO2005038415. The device in WO2005038415 comprises a transducer for transmitting and receiving acoustic signals, and a waveguide connected to the transducer and extending into the liquid. The liquid level is basically determined based on the speed of sound and the transit time of the acoustic signal from the transducer to a surface of the liquid (where it is reflected) and back to the transducer again. Since the speed of sound depends on gas composition and temperature which may vary from time to time, the current speed of sound is used in determining the liquid level, which current speed of sound in turn is determined by means of a reference system in the waveguide. Further, since the gas composition and temperature in the reference system may differ from the gas composition and temperature in the rest of the waveguide above the liquid, for instance if the liquid level is low, a fuel pump associated with the tank is used to feed a flow of fluid (namely fuel) originating from the tank into a portion of the waveguide which in use is located above the liquid. The flow of fuel levels the temperature and gas composition, and consequently the speed of sound, throughout the waveguide above the liquid, which in turn allows for a more accurate measurement of the liquid level.

However, the device in WO2005038415 relies on the fuel pump to provide the flow of fluid, which may require extensive and costly modifications of the fuel pump and the associated tank when installing the measurement device.

SUMMARY OF THE INVENTION

It is an object of the present invention to at least partly overcome this problem, and to provide an improved liquid level measurement device, which device in particular is relatively inexpensive to realise and implement and does not require interaction with a fuel pump or other external part.

These and other objects that will become apparent from the following description are achieved by a measurement device and method according to the appended claims.

According to an aspect of the present invention, there is provided a device for providing a compensated measurement of the level of a liquid in a tank, the device comprising a transducer adapted to transmit and receive acoustic signals; a waveguide connected to the transducer and adapted to extend into the liquid; collecting means for collecting free-moving portions of said liquid; and directing means for directing fluid originating from liquid collected by the collecting means into or along a portion of the waveguide which during operation is located above the liquid level.

When a tank for instance is installed in a vehicle such as a car or boat, the liquid contained in the tank is seldom still. Instead, it moves and splashes around in the tank when the vehicle is in motion. Also, when the tank is refuelled, there is a flow of moving liquid coming for the tank. Hence, the present invention is based on the understanding that at least part of such free-moving liquid can be collected and directed into or along the waveguide, to allow the compensated more accurate measurement. Namely, the collecting and directing means are arranged such that the composition of gas and/or the temperature and thereby the speed of sound is levelled throughout the waveguide above the liquid level.

Preferably, the device further comprises at least one reference element arranged in the waveguide, wherein the portion of the waveguide between the transducer and the reference element is defined as a reference part, and wherein the directing means is adapted to direct fluid originating from liquid collected by the collecting means into or along said reference part.

It should be noted that U.S. Pat. No. 5,471,872 (Cummings) discloses an acoustic liquid level detector system comprising a first waveguide, a transmitter and receiver operably associated with the first waveguide, a second waveguide, and a secondary reflector arranged at an angled juncture between the first and second waveguides. Further, the second waveguide is provided with a plurality of orifices to allegedly facilitate ingress of liquid and flow of a cleaning purge gas outwardly of the second waveguide. Hence, any free-moving liquid entering the second waveguide via said orifices will not level the composition of gas and/or the temperature all the way through the waveguide above the liquid level, only (possibly) in the lower portion of the second waveguide between the orifices and the liquid surface. In particular, no collected liquid is directed into or along the first waveguide between the transmitter/receiver and the secondary reflector.

In one embodiment, the collecting means has a liquid catching surface or opening, the directing means has an opening into the waveguide, and the liquid catching surface or opening of the collecting means has a larger (cross-sectional) area than the opening of the directing means. That is, the collecting means and the directing means together form a control volume representing a nozzle.

In one embodiment, the collecting means is further adapted to flowingly discharge collected liquid (i.e. liquid collected by the collecting means). This facilitates the transportation of collected liquid by the directing means since the liquid is already in motion. The collecting means may for instance comprise a funnel-shaped structure. When using a funnel-shaped collecting structure, the liquid caught therein may be the flowingly directed out therefrom at the smaller end of the funnel-shaped collecting structure, allowing the collected liquid to be transported into or along the waveguide. The height of the funnel is preferably vertically aligned, to fully benefit from the gravitational forces to capture liquid in the funnel and direct a downward flow of liquid, but the funnel may alternatively be tilted to collect splashes or splatter or other free-moving liquid corning from the side. Instead of a funnel-shaped collecting structure, a (slightly) tilted collecting channel or trough (at the lower end of which a discharge flow of collected liquid may be provided) could be used. As directing means, a hole or aperture or conduit or branched conduit between the collecting means and the waveguide to direct fluid originating from the collected liquid into the waveguide at one or several locations could here be used. The fluid lead by the directing means may generally be collected liquid itself or gas evaporating from the collected liquid. Alternatively, the directing means could be a pipe or tube arranged adjacent to or in contact or integrated with at least a part of the waveguide to direct the collected liquid along the exterior of the waveguide. When directing the collected liquid into the waveguide, both gas composition and temperature may be accounted for. On the other hand, when directing gas from the collected liquid into the waveguide, mainly gas composition may be accounted for, and when directing the collected liquid along the exterior of the waveguide, only temperature may be accounted for, which may be sufficient for diesel which do not evaporate to the same extent as petrol or gasoline.

In one embodiment, the directing means is further adapted to transport collected liquid by means of capillary attraction. This allows transportation of non-flowing collected liquid, which may simplify the construction of the collecting means. Also, it allows "upwards" transportation of collected liquid, increasing the design options of the measurement device. To this end, the directing means may be a tube or tubes so narrow that collected liquid is "automatically" transported therein by capillary attraction. Alternatively, the directing means may comprise a piece of absorbing material also benefiting from capillary attraction or action. As collecting means, a simple collecting cup or a piece of absorbing material, such as porous felt or cloth, which piece of absorbing material effectively may take up splashes of liquid in the tank coming from several or all directions, could here be used. In one embodiment, a single piece of absorbing material may beneficially act as both collecting and directing means, which facilitates the construction of the device.

The present device is relatively inexpensive and easy to realise and implement. For instance, it does not require modifications of the fuel pump and the associated tank as the above prior art solution. Yet the present device effectively allows the provision of an accurate, compensated liquid level measurement.

In one embodiment, the device further comprises at least one retaining member for at least temporarily retaining liquid in the device during operation. The liquid is preferably retained at a predetermined position in the device. The retained liquid may slowly evaporate and level the gas composition in the device where the acoustic signal travels, with a more accurate measurement of the liquid level as a result. The retained liquid is preferably liquid originating from the tank, for example it may be a portion of the liquid collected by the collecting means and entered into the device by the directing means. Further, the at least one retaining member may be arranged in the waveguide, or in case a portion of the waveguide is accommodated in or formed by a housing of the device, in association with the housing. The retaining member may for instance be a recess in the waveguide or a cup in the housing, grooves transversely provided on the floor of the waveguide in order to slow down and retain liquid flowing across the floor, or a piece of absorbing material (e.g. a spongy or porous material or felt or the like) adapted to absorb liquid. Further, the at least one retaining member is preferably embedded in the waveguide so as to be in level with a waveguide wall, at least when containing liquid during operation, in order to not significantly affect the acoustic signals travelling in the waveguide. A cup may for instance be embedded in an inner wall of the waveguide as a recess, so that when the recess is filled with liquid, the surface of the liquid is substantially in level with the inner wall of the waveguide, creating a smooth surface for the acoustic waves to pass without being disturbed (a rough surface may cause unwanted reflections of the acoustic signals, which in turn may lead to erroneous measurements of the tank liquid level). Likewise, the piece of absorbing material may be embedded in a size-matched recess or hole in an inner wall of the waveguide, so that the top surface of the piece of absorbing material is substantially in level with the inner wall of the waveguide. Due to its substantially fixed size, the piece of absorbing material can be made not to affect the acoustic signals in the waveguide even when it does not retain liquid, which beneficially serves to reduce unwanted reflections.

In one embodiment, the device further comprises a valve having an inlet adapted to receive liquid, two outlets which each may be in fluid communication with the inlet, and a spherical element moveable in response to gravitational and/or centrifugal forces for automatically closing one of the outlets when the device is tilted. The three-way valve (one inlet, two outlets) of the present embodiment is advantageously used to automatically distribute liquid or fluid to different portions of the waveguide, especially to an upper portion when the device is tilted, the upper portion which otherwise usually is drained when the device is tilted. The three-way valve is also useful for automatically distributing liquid to a portion of the waveguide drained due to centrifugal forces, which may occur when the measurement device is quickly moved from side to side, as for instance when installed in a car. The liquid received at the inlet is for example the liquid collected by the collecting means.

In one embodiment, a portion of the waveguide is formed by a first part with a surface having a recess defining the waveguide portion and a protrusion with a groove running along the recess, and a second part with a surface closing the recess of the first part to form the waveguide portion and further having a recess matching and engaging the protrusion of the first part so that a channel running along the waveguide portion is formed by the groove in the protrusion of the first part and the recess of the second part, whereby any small clearance between the channel and the waveguide portion is sealed by liquid when liquid during operation travels between the channel and the waveguide portion. The structure of the present embodiment allows liquid (e.g. liquid collected by the collecting means) to be delivered to the waveguide portion on various locations along the waveguide portion via the small clearances (to create the levelled atmosphere), while at the same time the means for delivering the liquid from the channel into the waveguide part (e.g. the small clearances) are sealed so that they do not affect or disturb the acoustic signal travelling in the waveguide. The device may further comprising protrusions, e.g. small pins or the like, between the channel and the waveguide portion to (intentionally) create the small clearances between the channel and the waveguide portion through which liquid in the channel during operation can pass to the waveguide portion, in order to create the levelled atmosphere.

According to another aspect of the present invention, there is provided a method for providing a compensated measurement of the level of a liquid in a tank, the method comprising the steps of transmitting an acoustic signal from a transducer into a waveguide adapted to extend into the liquid; receiving a reflected acoustic signal to the transducer from the waveguide; collecting free-moving portions of said liquid; and directing fluid originating from liquid collected in the previous collecting step into or along a portion of the waveguide which during operation is located above the liquid level. In one embodiment, the method further comprises the step of at least temporarily retaining liquid in the device during operation. This aspect exhibits similar advantages and may exhibit similar features as the previously discussed aspect of the invention.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1:
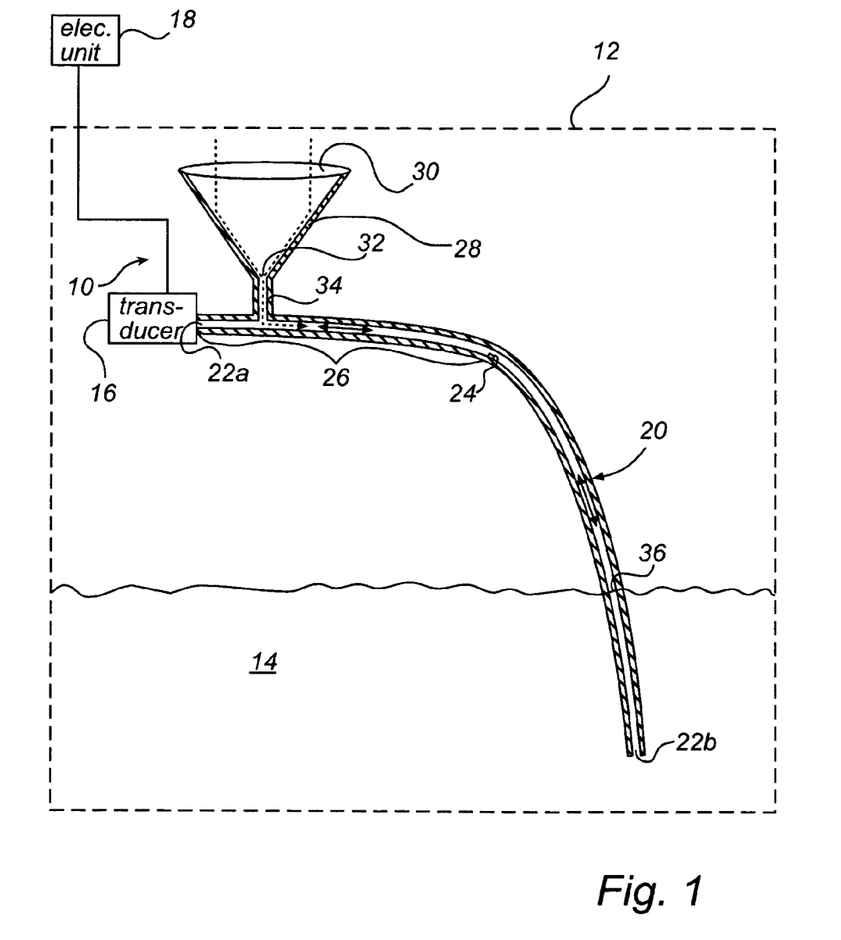
FIG. 1 is a schematic at least partly cross-sectional side view illustrating a liquid level measurement device arranged in a tank according to an embodiment of the present invention.

FIG. 1 is a schematic at least partly cross-sectional side view illustrating a liquid level measurement device 10 arranged in a tank 12 according to an embodiment of the present invention.

The measurement device 10 is generally adapted to detect or measure the level of a liquid 14 in the tank 12. The tank 12 may for instance be a fuel tank for a vehicle, such as a car, truck or boat.

The measurement device 10 comprises a transducer 16. The transducer 16 is an electro-acoustic transducer generally adapted to convert electrical signals to acoustic signals or sound pulses (exemplary frequency of about 3.4-17 kHz), and vice versa. The transducer 16 may for instance comprise a double-acting piezoelectric component, or comprise of a separate sound transmitter and sound receiver. In FIG. 1, the transducer 16 is placed inside at the top of the tank 12, but it could alternatively be placed outside the tank 12.

The measurement device 10 further comprises an electronic unit 18 connected to the transducer 16 for supplying electrical signal thereto and to evaluate electrical signals therefrom. The electronic unit 18 is preferably arranged outside the tank 12.

The measurement device 10 further comprises a waveguide 20 generally adapted to guide acoustic signals (illustrated by ↔). The waveguide may for instance be a tube or pipe in which acoustic signals can be guided. One end 22a of the waveguide 22 is connected to the transducer 16 to guide the acoustic signals to and from the transducer 16, and an opposite open end 22b is adapted to be extended or submersed into the liquid 14.

The measurement device 10 further comprises at least one reference element 24 arranged in the waveguide 20. The reference element 24 may for instance be a small protrusion such as a pin or tap or ring adapted to partly reflect an acoustic signal travelling in the direction away from the transducer 16 in the waveguide 20. The reference element 24 is preferably arranged a known distance from the transducer 16 above a predetermined point in the wave guide 20 up to which liquid generally is allowed to reach. The portion of the waveguide between the transducer 16 and the reference element 22 is defined as a reference part 26. At least a portion of the reference part 26 may have a helical or flat spiral shape (not shown in FIG. 1) in order to save space, and at least a portion of the reference part 26 could also be placed outside the tank 12.

The measurement device 10 further comprises a funnel 28 generally shaped like hollow cone and having a larger (top) catching end (liquid catching opening) 30 and a smaller (bottom) discharge end 32 which is fluidly connected to the waveguide 20 via a conduit 34, the catching end 30 having a larger diameter than the diameter of the conduit 34. Namely, the conduit 34 leads to the reference part 26 of the waveguide 20, preferably close to the transducer 16. The funnel 28 is preferably so arranged in relation to the rest of the measurement device 10 that any liquid collected in the funnel 28 is flowingly provided out from the discharge end 32 via the conduit 34 and into the reference part 26 of the waveguide 20 due to gravitational forces. The height of the funnel 28 may for instance be vertically aligned as in FIG. 1.

An exemplary operation of the present measurement device 10 when in use in the tank 12 will now be described. First, an electrical signal or pulse is provided by the electronic unit 18 to the transducer 16 causing the transducer 16 to transmit a corresponding acoustic signal or sound pulse. The transmitted acoustic signal is guided by the waveguide 20 towards a surface 36 of the liquid 14. Part of the acoustic signal is reflected back towards the transducer 16 by the reference element 24, while the rest of the acoustic signal continues towards the surface 36 where it is reflected and then returned to the transducer 16 via the waveguide 20. In response to the two returning acoustic signals, the transducer 16 generates corresponding electric signals. The electronic unit 18 first uses the transit time for the signal reflected by the reference element 24 together with the known distance between the transducer 16 and reference element 24 to calculate the current speed of sound. The electronic unit 18 then calculates the level of liquid in the tank 12 based on the current speed of sound and the transit time for the signal reflected by the liquid surface 36.

Concurrently, when a vehicle in which the tank 12 is installed is in motion, the liquid 14 in the tank 12 moves and splashes around in the tank 12. The resulting splashes or splatter of liquid (illustrated as dashed arrows) are at least partly collected by the funnel 28. The liquid collected in the funnel 28 is then discharged as a flow of liquid through the discharge end 32 of the funnel and is directed via the conduit 34 into the reference part 26 of the waveguide 20. The collected liquid introduced into the waveguide 20 may then return to the tank 12 via the waveguide itself or via drainage holes (not shown in FIG. 1) in the waveguide. When collected liquid (especially gasoline or petrol in case the tank 12 is a fuel tank) is flowing in the waveguide 20 and evaporates, the temperature and gas composition, and consequently the speed of sound depending on temperature and gas composition, is levelled throughout the waveguide 20 above the liquid (i.e. in the reference part 26 and the portion of the waveguide 20 between the reference part 26 and the liquid surface 36), which in turn allows for a more accurate measurement of the liquid level, since the speed of sound in the portion of the waveguide 20 between the reference part 26 and the liquid surface 36 becomes substantially the same as the current speed of sound calculated with the reference measurement. For this, the funnel 28 and directing means (conduit 34 in FIG. 1) should be suitably dimensioned and positioned so as to provide a flow of liquid in the waveguide 20 which is small enough to allow the acoustic signals to travel in the waveguide 20, but at the same is time allows steam to be released from the collected liquid for the above levelling and compensation.

Figure 2A:
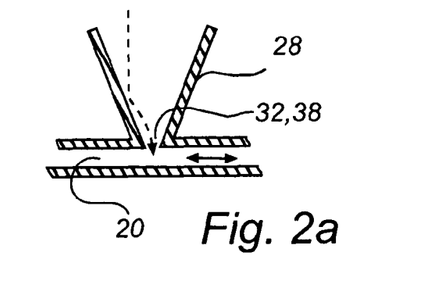
FIGS. 2a-2g are schematic at least partly cross-sectional views illustrating details of variants of the device of FIG. 1.
Figures 2B, 2D:
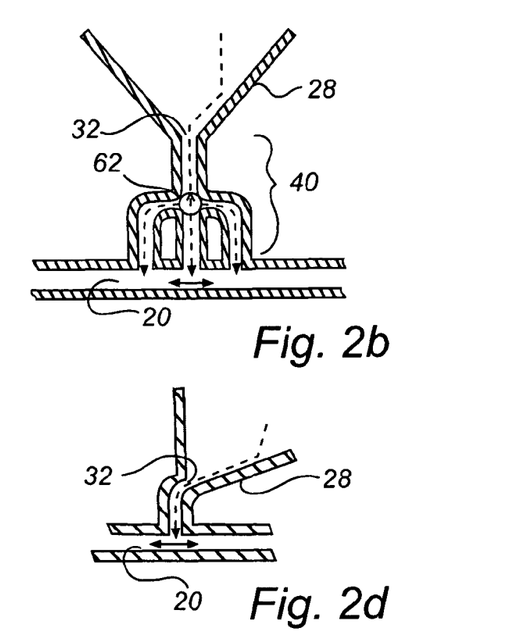
Figure 2C:
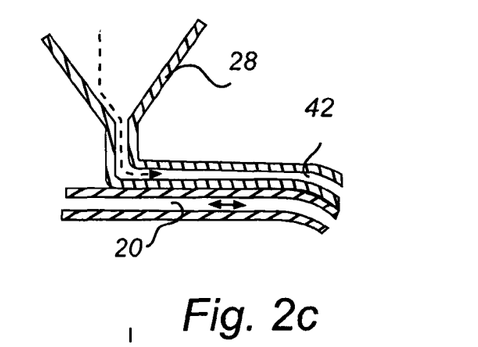
Figure 2E:
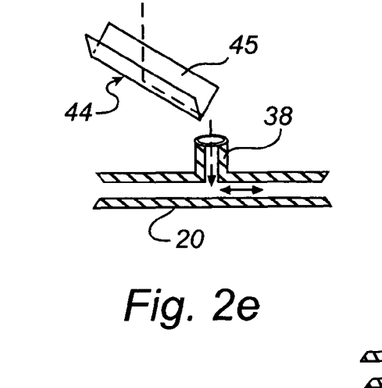
Figure 2F:
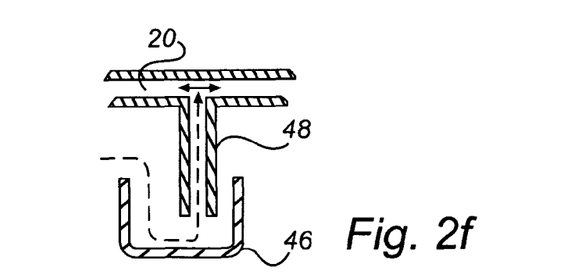
Figure 2G:
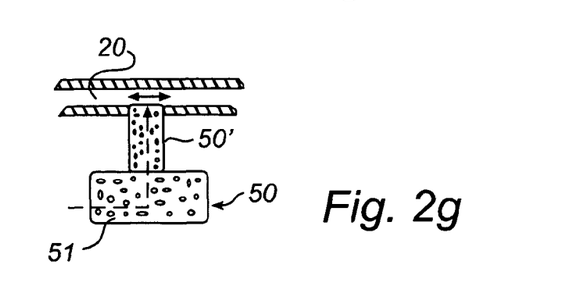

Variants of the device illustrated in FIG. 1 include replacing the conduit 34 by a hole or aperture 38 directly connecting the discharge end 32 of the funnel 28 with the waveguide 20 (FIG. 2a). Omitting the conduit 34 allows a construction with fewer parts. Further, the conduit 34 may be replaced with a branched conduit 40 or the like to direct liquid from the funnel 26 into the waveguide 20 at several locations (FIG. 2b). Directing liquid into the waveguide at several locations (using the branched conduit 40) may enhance the levelling of the atmosphere in the waveguide 20. Further, the conduit 34 may be replaced by a tube or pipe 42 arranged adjacent to or in contact or integrated with at least a portion of the waveguide 20 to direct the collected liquid along the exterior of the waveguide 20 (FIG. 2c). Here, only temperature may be accounted for, which may be sufficient in case the liquid is diesel which do not evaporate to the same extent as petrol or gasoline. At the same time, no opening for directing the liquid into the waveguide as well as drainage facilities are required, which is beneficial from a construction and cost point of view. Further, the funnel 28 may be tilted so as to catch splashes or splatter coming from the side (FIG. 2d). Here, the angle of an inner wall of the funnel 28 as seen from a horizontal plane is preferably larger than a maximum tilt angle of the measurement device 10 to allow collected splashes to run into the conduit 32. Nevertheless, splashes could force themselves into the conduit 32 due to their kinetic energy. Further, the funnel 28 may be replaced by a tilted collecting channel or trough 44 (FIG. 2e), the channel 44 having a liquid catching surface 45 with a larger area than the cross sectional area of the opening 38. Further, the funnel 28 may be replaced by a simple collecting cup or open container 46 from which liquid is lead up into the waveguide 20 via at least one tube 48 which is so narrow that liquid from the cup 46 is transported into the waveguide 20 by means of capillary attraction (FIG. 2f). Further, the funnel 28 may be replaced by a piece of absorbing material 50 which may take up splashes of liquid in the tank 12 from all directions (FIG. 2g) by means of its liquid catching surface 51 which is the exposed area of the piece of absorbing material 50. The absorbing material 50 may extend (50') into the waveguide 20 so that liquid collected by it is transported by capillary attraction into the waveguide 20. Preferably, the liquid catching surface 51 is larger than the opening into the waveguide 20 for the extension 50'. Further, the absorbing material 50' could be used as means for directing liquid into the waveguide from the collecting cup 46, and the above narrow tube(s) 48 could be used as means for directing liquid into the waveguide from the absorbing material 50. Also, several funnels 28 or other collecting structures or means having a liquid catching surface can be provided for a single measurement device to collect a desired amount of liquid (not shown).

Further, except for catching splashes, the above various collecting means can catch other free-moving liquid outside or inside the tank, which moving liquid is from refuelling of the tank 12, for example.

Figure 3A:
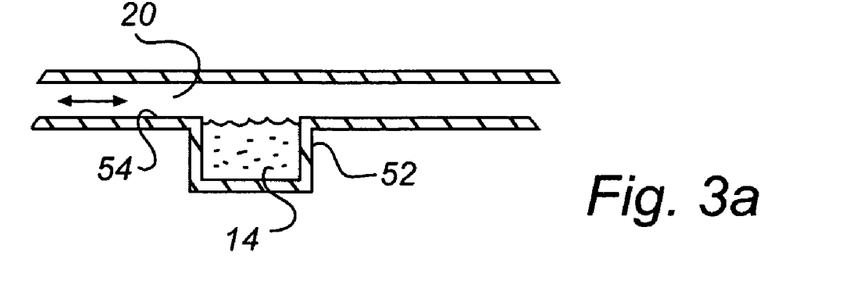
FIGS. 3a-3c are schematic cross-sectional side views illustrating retaining members according to embodiments of the present invention.
Figure 3B:
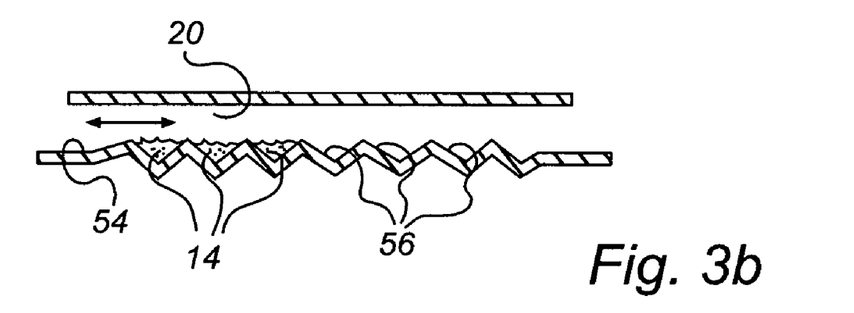
Figure 3C:
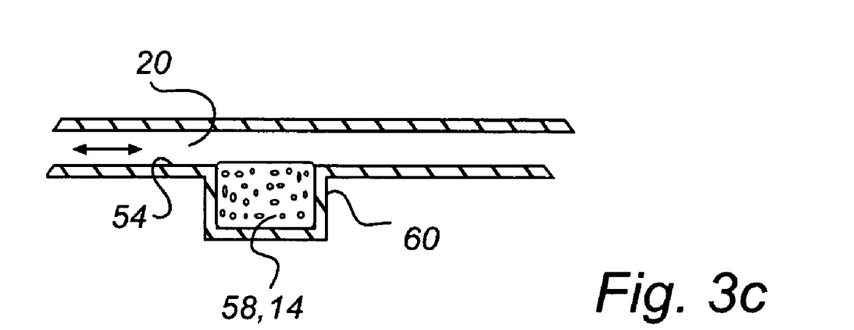

FIGS. 3a-3c are schematic cross-sectional side views illustrating retaining members according to embodiments of the present invention. For instance in the above measurement device 10, retaining members may be introduced to keep the collected liquid entered into the waveguide 20 some time in the waveguide 20 to allow enough liquid to evaporate, especially in case the device 10 is tilted and the liquid otherwise would quickly drain off.

In FIG. 3a, the retaining member is an open container or recess 52 embedded in a bottom inner wall or the floor 54 of the waveguide 20. When liquid flows over the floor 54 through the waveguide 20, the recess 52 is filled with liquid 14. Thus, should the flow of liquid along the interior of the waveguide 20 (temporarily) cease, there is still some liquid in the waveguide, namely in the retaining recess 52, which retained liquid may serve to balance the gas composition and temperature in the waveguide 20. Further, when the recess 52 in the substantially horizontal floor 54 is more or less completely filled with liquid 14, the surface of the liquid 14 is substantially in level with the floor 54 of the waveguide 20, creating a smooth surface for the acoustic waves to pass without being disturbed. In case the retaining recess 52 is arranged in an inner wall of the waveguide 20 which inner wall is not generally horizontal, the recess 52 can be filled with a liquid absorbing material, see also FIG. 3c.

In FIG. 3b, the retaining member is transversal grooves 56 arranged on the floor 54 of the waveguide 20, in order to slow down and retain liquid 14 flowing across the floor 54 transversal to the grooves 56.

In FIG. 3c, the retaining member is a piece of liquid absorbing material 58, for instance a spongy or porous material or felt or the like adapted to retain liquid 14 running through the waveguide 20. The piece of absorbing material 58 is preferably embedded in the waveguide 20 so as to not disturb (reflect) any incoming acoustic signal or sound pulse. The piece of absorbing material 58 can be size-matched to and placed in a recess 60 in the waveguide 20 (like the recess 52 of FIG. 3a), to create a smooth surface for the acoustic signals to pass. The piece of absorbing material 58 (with optional recess 60) can advantageously be arranged horizontally as well as vertically or inclined.

It should be noted that the above retaining members could as an alternative or complement be arranged in a housing (not shown in FIGS. 3a-3c) accommodating or forming a portion of the waveguide 20. Also, the measurement device may comprise several of the above retaining members as well as combinations of the above retaining members. Also, the above retaining members may be used with means or devices adapted to feed a flow of liquid into the waveguide other than the above collecting and directing means, or in other applications.

Figure 4A:
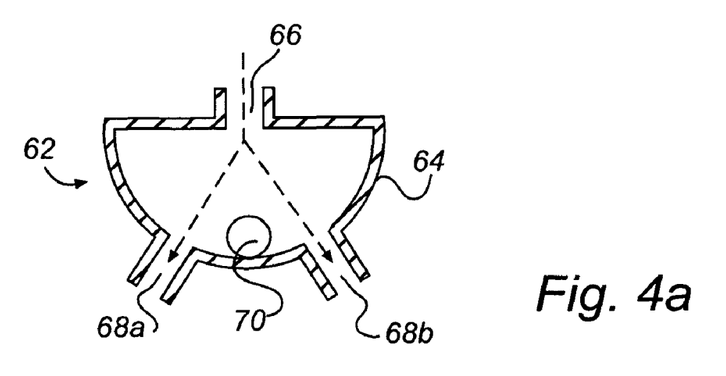
FIGS. 4a-4c are schematic cross-sectional side views illustrating an automatic three-way distribution valve according to an embodiment of the present invention.
Figure 4B:
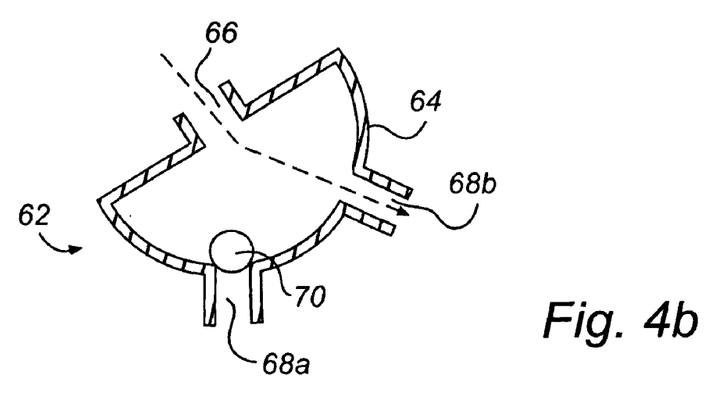
Figure 4C:
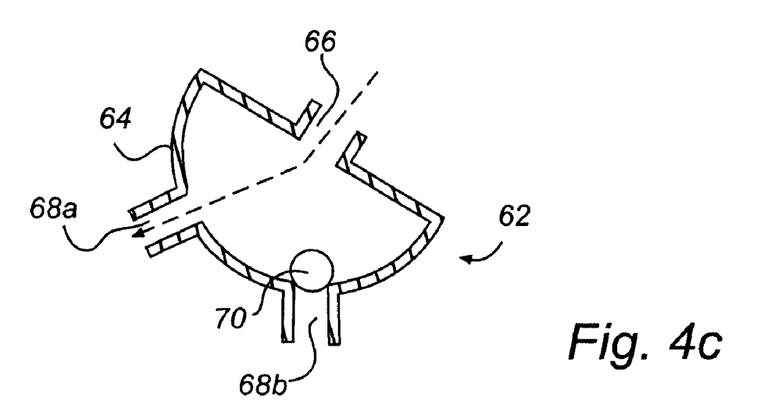

FIGS. 4a-4c are schematic cross-sectional side views illustrating an automatic three-way distribution valve 62 according to an embodiment of the present invention. The valve 62 comprises a housing 64 having one inlet 66 in fluid communication with each of two outlets 68a, 68b. The inlet 66 and outlets 68a, 68b are here apertures. The valve 62 further comprises a weighted, at least partially spherical element, such as a ball 70, placed in the housing 64. The valve 62 is so adapted that when it is not substantially tilted or inclined or subjected to centrifugal forces, the ball 70 is in an intermediate position allowing any liquid or fluid from the inlet 66 to pass to both the outlets 68a, 68b (FIG. 4a). The floor of the housing 64 may for instance be concave with one outlet 68a (68b) on each side of the central lowest point (when the valve 62 is substantially horizontal), the ball 70 resting at said central lowest point in the intermediate position. However, when the valve 62 is tilted or inclined or subjected to centrifugal forces, the ball 70 due to its own weight is moved in relation to the rest of the valve 62 to close one of the outlets 68a (68b) so that liquid from the inlet 66 only can pass to the other outlet 68b (68a) (FIGS. 4b, 4c). The ball 70 should be sized so as to close the respective outlet apertures 68a, 68b and remain there for predetermined tilt angles and/or centrifugal forces (by resting in the aperture (FIG. 4) or against some other appropriately positioned structure (not shown) of the valve housing). Further, the inlet 66 should be positioned so that it is not closed by the ball 70 when in the intermediate position. For instance, the inlet 66 may be placed in the top of the housing 64 as shown in FIGS. 4a-4c.

The valve 62 is advantageously used in the above measurement device 10 to automatically distribute collected liquid to different portions of the waveguide 20, especially to a portion which usually is drained when the device 10 is tilted or inclined or subjected to centrifugal forces. The valve 62 can for instance form part of the above branched conduit or be otherwise arranged between the above collecting means and the waveguide, as illustrated in FIG. 2b. It should however be noted that the valve 62 may be used with means or devices adapted to feed a flow of liquid into the waveguide other than the above collecting and directing means, or in other applications.

Figure 5A:
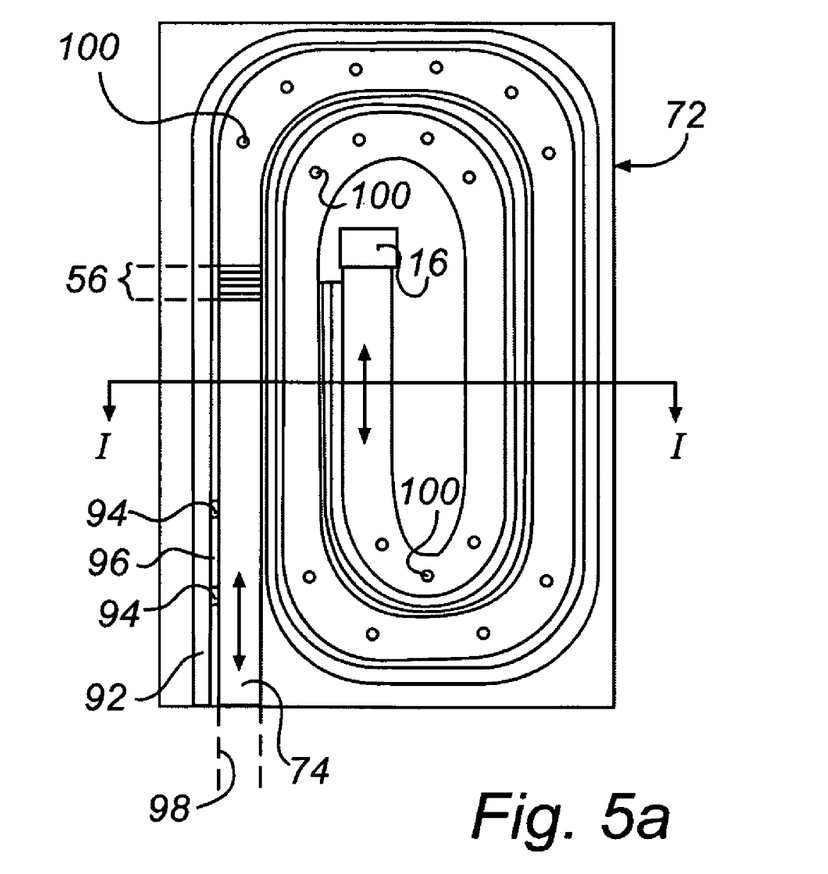
FIGS. 5a-5b are cross-sectional views of a liquid level measurement device housing according to an embodiment of the present invention.
Figure 5B:
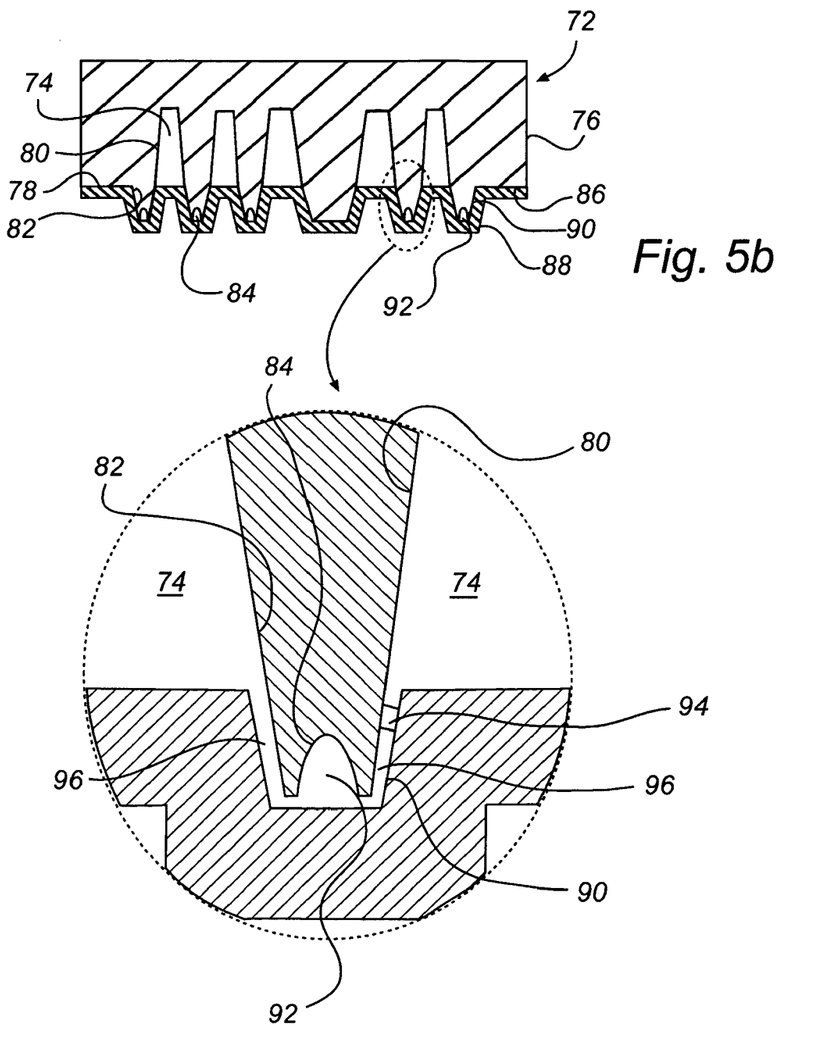

FIGS. 5*a*-5*b* are cross-sectional views of a liquid level measurement device housing 72 according to an embodiment of the present invention, which housing 72 (among other things) forms a portion 74 of a waveguide. The waveguide may for instance be the above waveguide 20, the portion 74 may correspond to at least a portion of the above reference part 26, and the housing 72 may in turn form part of the above measurement device 10. FIG. 5*a* is a top cross-sectional view of the housing 72, and FIG. 5*b* is a side cross-sectional view of the housing 72 along the cut I-I in FIG. 5*a*.

The housing 72 comprises a first (top) part 76 with a surface 78 having a recess 80 defining the waveguide portion 74. The recess 80 runs in a spiral pattern from one edge of the housing 72 to a more central position of the housing 72. Along with the recess 80 in essentially the same spiral pattern runs a protrusion 82. In the tip of the protrusion 82, there is provided a groove 84, which consequently also essentially runs along the recess 80. Facing the surface 78 of the first part 76, there is provided a surface 86 of a second (bottom) part 88 comprised in the housing 72. The surface 86 of the second part 88 has a recess 90 matching and at least partially engaging (when assembled) the protrusion 82 of the first part 76, while portions of the surface 86 between the recess 90 of the second part 88 substantially closes the recess 80 of the first part 76 forming said waveguide portion 74. The waveguide portion 74 thus runs from the one edge to the more central portion of the housing 72. Further, a channel 92 running along the waveguide portion 74/recess 80 from the one end to the more central position of the housing 72 is formed by the groove 84 in the protrusion 82 of the first part 76 and the recess 90 of the second part 88 when the first and second parts 76 and 88 are assembled. Due to mismatching dimensions or through holes or by intentionally placing small pins 94 between the protrusion 82 and the recess 80 along the channel 92, small clearances 96 are created between the first part 76 and the second part 88 to allow fluid communication between the channel 92 and the waveguide portion 74. Further, the second part 88 is advantageously made somewhat flexible, which facilitates sealing between the channel 92 and waveguide portion 74, and makes assembly of the first and second parts 76 and 88 easier. The profile of the second part 88 may for instance follow the recessed surface 86 thereof as in FIG. 5*b*.

In the context of the above measurement device 10, a purpose of the waveguide portion 74 is to guide therein acoustic signals to and from the transducer 16 which suitably is arranged at the end of the waveguide portion 74 at the more central position in the housing 72. An additional waveguide portion 98 forming part of the waveguide 20 may be arranged at the end of the waveguide portion 74 at the one edge of the housing 72 to further guide the acoustic signals to and from the liquid surface. Further, a purpose of the channel 92 is to lead therein liquid from the tank in which the measurement device 10 is mounted, for instance liquid collected by the funnel 28. The funnel 28 is preferably connected to the end of the channel 92 at the one end of the housing 72, for instance via the conduit 34. Additionally, the funnel 28 (or another funnel or other collecting means) may be fluidly connected to the channel 92 also at other locations in order to provide liquid into the channel 92 to other portions of the channel 92. The distribution of liquid to various portions of the channel 92 (and thus to various portions of the waveguide portion 74 as will be explained next) may for instance be controlled by using the above automatic three-way distribution valve 62 installed between the funnel 28 and channel 92. The liquid in the channel 92 may sip through clearances 96 and into the waveguide portion 74 at various locations in order to create the levelled atmosphere in the waveguide portion 74. At the same time, the clearances 96 are sealed by the liquid "contained" in them so that they do not affect or disturb the acoustic signals travelling in the waveguide portion 74 to and from the transducer 16. Thus, present housing 72 allows delivery of liquid into the waveguide portion 74 without the means for delivery significantly affecting the acoustic signal propagation. Overall, a more accurate measurement of the tank liquid level may be obtained.

It should be noted that the above housing may be used with means or devices adapted to feed a flow of liquid into the waveguide other than the above collecting and directing means. Further, any of the above retaining members may be used in or built into the housing. Also, drainage holes 100 may be provided in the floor of the waveguide portion 74 to avoid the waveguide portion 74 from being flooded. Suitable positions of the drainage holes 100 include the curved parts of the waveguide portion 74 (as shown in FIG. 5*a*), where liquid otherwise tends to accumulate when the housing 52 is tilted or subjected to centrifugal forces or the like. Also, the housing may 72 comprise more pins 94 than the exemplary ones shown.

The person skilled in the art realizes that the present invention by no means is limited to the preferred embodiments described above. On the contrary, many modifications and variations are possible within the scope of the appended claims. For example, although acoustic pulses have been used in the described embodiments, the inventive measurement device may also be used with other measurement modes such as standing wave measurement. Also, the above embodiments and variants may be combined in several ways.

The invention claimed is:

1. A device for providing a compensated measurement of the level of a liquid in a tank, comprising:
 a transducer adapted to transmit and receive acoustic signals;
 a waveguide connected to the transducer and adapted to extend into the liquid;
 a passive collecting device to collect free-moving portions of said liquid, the free-moving portions including splashes of liquid; and
 a directing device to direct fluid originating from liquid collected by the passive collecting device into or along a waveguide portion which during operation is located above the liquid level, such that at least one of the composition of gas and the temperature and thereby the speed of sound is made uniform throughout the waveguide above the liquid level.

2. A device according to claim 1, further comprising:
 at least one reference element arranged in the waveguide, wherein the portion of the waveguide between the transducer and the reference element is defined as a reference part, and wherein the directing device is adapted to direct fluid originating from liquid collected by the passive collecting device into or along said reference part.

3. A device according to claim 2, wherein the passive collecting device includes a liquid catching surface or opening, the directing device includes an opening into the waveguide, and the liquid catching surface or opening of the passive collecting device has a larger area than the opening of the directing device.

4. A device according to claim 1, wherein the one passive collecting device includes a liquid catching surface or opening, the directing device includes an opening into the waveguide, and the liquid catching surface or opening of the passive collecting device has a larger area than the opening of the directing device.

5. A device according to claim 1, wherein the passive collecting device is further adapted to flowingly discharge collected liquid.

6. A device according to claim 1, wherein the directing device is further adapted to transport collected liquid by way of capillary attraction.

7. A device according to claim 1, further comprising:
at least one retaining member for temporarily retaining liquid in the device during operation.

8. A device according to claim 7, wherein the at least one retaining member is adapted to temporarily retain liquid at a predetermined position in the device during operation.

9. A device according to claim 8, wherein said at least one retaining member is embedded in the waveguide so as to be in level with a waveguide wall.

10. A device according to claim 7, wherein said at least one retaining member is embedded in the waveguide so as to be in level with a waveguide wall.

11. A device according to claim 1, further comprising:
a valve including an inlet adapted to receive liquid from the passive collecting device,
two outlets connected to the waveguide, said outlets being selectively in fluid communication with the inlet, and
a spherical element moveable in response to at least one of gravitational and centrifugal forces for automatically closing one of the outlets when the device is tilted.

12. A device according to claim 1, wherein a portion of the waveguide is formed by a first part with a surface including a recess defining the waveguide portion and a protrusion with a groove running along the recess, and a second part with a surface closing the recess of the first part to form said waveguide portion and further including a recess matching and engaging the protrusion of the first part so that a channel running along the waveguide portion is formed by the groove in the protrusion of the first part and the recess of the second part, whereby any clearance between the channel and the waveguide portion is sealed by liquid when liquid during operation travels between the channel and the waveguide portion.

13. A device according to claim 12, further comprising:
protrusions between the channel and the waveguide portion to create said clearances between the channel and the waveguide portion through which liquid in the channel during operation can pass to the waveguide portion.

14. A method for providing a compensated measurement of the level of a liquid in a tank, comprising:
transmitting an acoustic signal from a transducer into a waveguide adapted to extend into the liquid;
receiving a reflected acoustic signal to the transducer from the waveguide;
passively collecting free-moving portions of said liquid, the free-moving portions including splashes of liquid; and
directing fluid originating from liquid previously collected into or along a waveguide portion which, during operation, is located above the liquid level, such that the composition of at least one of the gas and the temperature and thereby the speed of sound is made uniform throughout the waveguide above the liquid level.

15. A method according to claim 14, further comprising: at least temporarily retaining liquid in the device during operation.

* * * * *